United States Patent
de Haart et al.

(10) Patent No.: US 6,528,197 B1
(45) Date of Patent: Mar. 4, 2003

(54) BIPOLAR PLATE WITH POROUS WALL FOR A FUEL CELL STACK

(75) Inventors: Lambertus G. J. de Haart, Heerlen (NL); Josefin Meusinger, Bischofsheim (NL)

(73) Assignee: Forshungszentrum Jülich GbmH, Jülich (DE)

(*) Notice: Subject to any disclaimer, the term of this patent is extended or adjusted under 35 U.S.C. 154(b) by 70 days.

(21) Appl. No.: 09/675,589

(22) Filed: Sep. 29, 2000

Related U.S. Application Data

(63) Continuation-in-part of application No. PCT/DE99/01057, filed on Apr. 1, 1999.

(30) Foreign Application Priority Data

Apr. 8, 1998 (DE) .......................... 198 15 796

(51) Int. Cl.$^7$ ................................ H01M 2/00
(52) U.S. Cl. ...................... 429/34; 429/32; 429/40; 429/43; 429/16
(58) Field of Search ................ 429/34, 32, 40, 429/43, 16

(56) References Cited

U.S. PATENT DOCUMENTS

| | | | |
|---|---|---|---|
| 5,034,288 A | * 7/1991 | Bossel | 429/32 |
| 5,643,690 A | 7/1997 | Tateishi et al. | 429/34 |

FOREIGN PATENT DOCUMENTS

| | | | |
|---|---|---|---|
| DE | 41 20 359 | | 1/1992 |
| EP | 0 108 467 | * | 5/1984 |
| EP | 0 297 315 | | 1/1989 |
| EP | 0 378 812 | * | 7/1990 |
| EP | 0 817 297 | | 1/1998 |

* cited by examiner

*Primary Examiner*—Laura Weiner
(74) *Attorney, Agent, or Firm*—Klaus J. Bach

(57) ABSTRACT

In a fuel cell stack including several fuel cells each comprising a cathode, an anode and an electrolyte layer disposed between the anode and the cathode, wherein the anode includes a catalyst for the reforming or for the oxidation of fuel and the fuel cells are electrically and mechanically interconnected by connecting elements which consist of a metal or metal alloy. The connecting elements include each a porous wall on which the anode is formed so as to be in close contact with the respective connecting element.

4 Claims, 1 Drawing Sheet

BIPOLAR PLATE WITH POROUS WALL FOR A FUEL CELL STACK

This is a continuation-in-part application of international application PCT/DE99/01057 filed Apr. 1, 1999 and claiming the priority of German application 198 15 796.7 filed Apr. 8, 1998.

BACKGROUND OF THE INVENTION

The invention relates to a fuel cell stack with connecting elements for the fuel cells of the stack and also to a manufacturing method.

A fuel cell includes a cathode, an electrolyte as well as an anode. An oxidation medium such as air is supplied to the cathode and a fuel such as hydrogen is supplied to the anode.

Various types of fuel cells are known for example the SOFC-fuel cell disclosed in the printed publication DE 44 30 958 C1 and the PEM fuel cell disclosed in the printed publication DE 195 31 952 C1.

The SOFC-fuel cell is also called high-temperature fuel cell since it has an operating temperature of up to 1000° C. In the presence of an oxidation medium, oxygen ions are formed at the cathode of a high-temperature fuel cell. The oxygen ions pass through the electrolyte and recombine at the anode side with the hydrogen of the fuel to form water. During the recombination electrons are released whereby electric energy is generated.

The operating temperature of a PEM fuel cell is at about 80° C. In the presence of the fuel, protons are formed at the anode of a PEM fuel cell by means of a catalyst. The protons pass through the electrolyte and combine at the cathode side with the oxygen of the oxidation means to form water. During this process, electrons are released whereby electric energy is generated. For obtaining a large electric power output, generally several fuel cells are electrically and mechanically interconnected by connecting elements. An example of such a connecting element is the bi-polar plate disclosed in DE 44 10 711 C1. With the aid of bi-polar plates fuel cells can be arranged electrically in series and can be placed on top of one another. Such an arrangement is called a fuel cell stack.

As fuel methane or methanol, among others, can be used. The fuels mentioned are converted, by reformation or oxidation among others, to hydrogen or a hydrogen-rich gas.

It is known from the printed publication DE 195 198 47 C1 to reform fuel such as a methane internally, that is, directly at the anode of an SOFC fuel cell. A methane-steam reformation reaction is a highly endothermal reaction ($\Delta H = 227.5$ kJ/mol at 1000° C.) and extracts a corresponding amount of heat from the surrounding area. The reaction rate of the reformation reaction is generally very high in comparison with the subsequent electrochemical reaction. In an internal reformation, the reformation reaction may be completed already within a distance of 10 mm from the gas entrance into the anode chamber (the chamber in which the anode is disposed). The heat required within such a short distance cannot be sufficiently supplied by the essentially slower electrochemical reaction so that, with internal reformation, there is always a temperature collapse. This results in uneven temperature distributions and consequently destructive thermal tensions.

In order to mitigate this problem, in accordance with the printed publication DE 195 198 47 C1, the catalyst concentrations in the anode chamber are suitably reduced so that the methane-steam reformation reaction occurs in a delayed fashion.

In the German Patent application with the official No. 197 10 345.6-45, it is described that a glass-containing paste is to be disposed between an electrode of a high temperature fuel cell and the adjacent bi-polar plate in order to reduce contact problems resulting from uneven surfaces.

From the printed publication DE 195 47 700 A1, it is known to arranged electrode spaces within a self-supporting electrode consisting of a cermet. In this way, the flow path of an operating medium from the electrode chamber to the catalytically active layer is to be kept short.

It is the object of the present invention to provide an inexpensive simple connecting element with which contact problems with an adjacent electrode are reduced. It is a further object of the invention to provide a method of producing a stack of fuel cells, which includes the connecting element.

SUMMARY OF THE INVENTION

In a fuel cell stack including several fuel cells each comprising a cathode, an anode and an electrolyte layer disposed between the anode and the cathode, wherein the anode includes a catalyst for the reforming or for the oxidation of fuel and the fuel cells are electrically and mechanically interconnected by connecting elements which consist of a metal or metal alloy. The connecting elements include each a porous wall on which the anode is formed so as to be in close contact with the respective connecting element.

The connecting element consists—except for welding or soldering connections—essentially of a metal or of related metals, for example, of metals with comparable physical and chemical properties.

An anode is produced on the porous layer of the connecting element. For example, it is produced by pouring onto the porous layer a suspension, which contains the electrode material in the form of a powder. The electrode material is deposited on the connecting element as a layer. It is then dried and sintered.

Because the anode is produced on the connecting element, there are no contact problems resulting from uneven surfaces.

The porous separation wall inhibits the diffusion of operating media to the catalytically active layer. Only a part of the fuel in the entrance area of the respective anode chamber reaches directly the anode. As a result, the fuel to be reformed is evenly distributed in the anode chamber. Localized cooling is avoided in this way.

The porosity of the porous separation wall of the connecting element is preferably 20 to 60% in order to achieve the effect mentioned before.

In an advantageous embodiment of the invention, the connecting element consists particularly of an iron-chromium alloy, for example, of the alloy having the material number 1,4742. Such a connecting element can be employed at high temperatures of more than 500° C. The connecting element may be composed of different building components, which are soldered or welded together. Such a connection is more stable and easier to produce than a connection by a glass containing paste mentioned earlier.

In another advantageous embodiment, the anode consists of cermet so that it can be employed at high temperatures of over 500° C.

Producing an anode on the porous wall means that a preliminary body of the electrode is deposited on the porous wall and that the anode is formed from the preliminary body by subsequent treatment of the preliminary body.

BRIEF DESCRIPTION OF THE DRAWINGS

The sole

DESCRIPTION OF A PREFERRED EMBODIMENT

Figure 1:
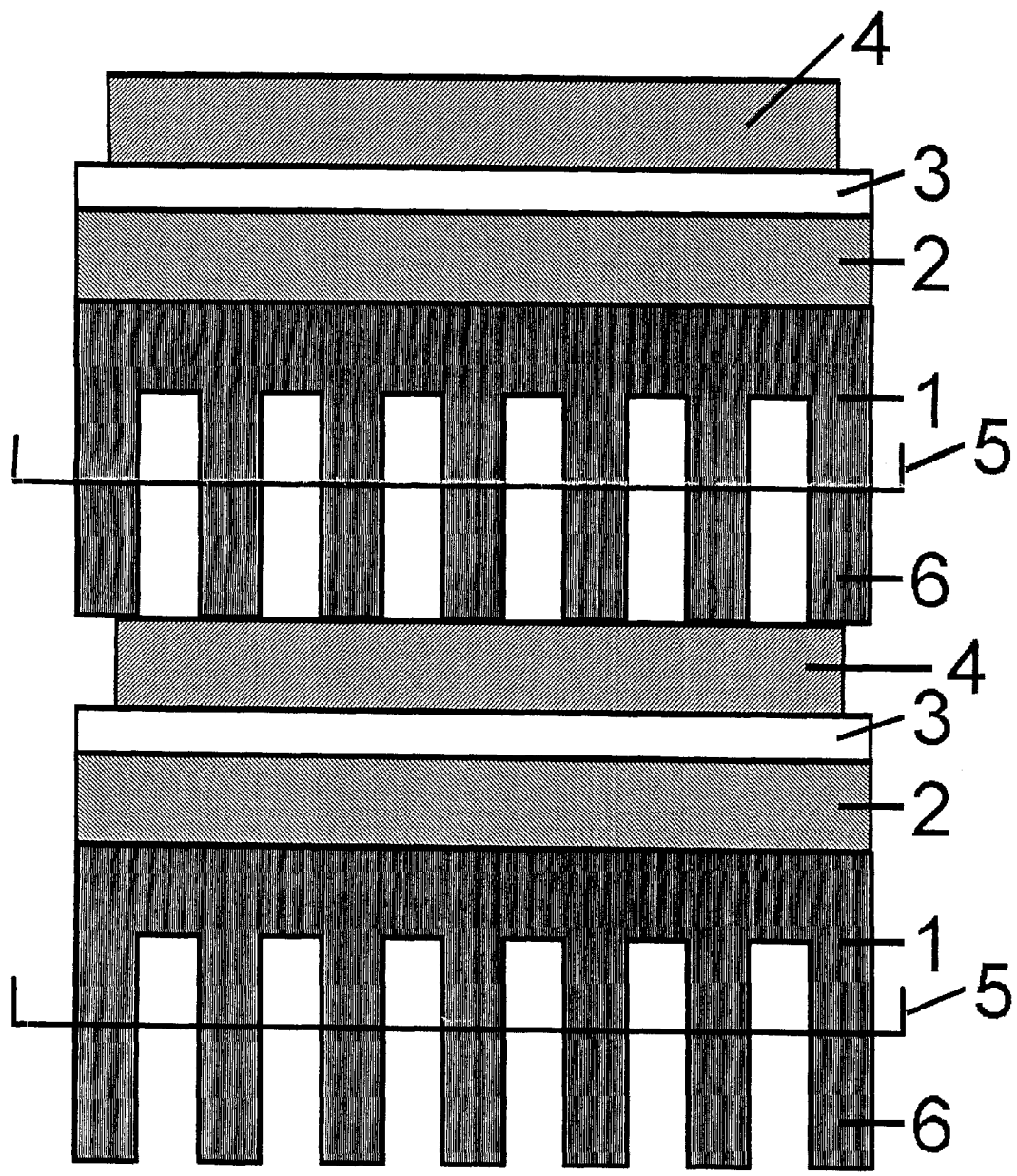
FIG. 1 shows a stack of two fuel elements interconnected by a connecting element (bipolar plate).

The FIGURE shows a fuel stack including two fuel cells interconncted by a connecting element 1. The connecting element 1 consists of a porous, temperature resistant alloy with through pores (open porosity). The porosity is 20 to 60%. The size of the pores is 0.1–10 $\mu$m. In a cross-section, it is comb-like. On the flat side (without the comb structure) of the connecting element (component 1), first an about 10 $\mu$m thick anode 2 is deposited. For forming the anode on the flat side a suspension is deposited which has the following properties:

- the suspension includes fine and coarse solid material parts consisting of the electrode material
- the maximum diameter of the coarse solid material components equals the minimum pore sizes in the flat surface.
- the fine solid material components are 5 to 12 times smaller than the coarse solid material components
- the content of the coarse solid material components in the suspension is 2–70 vol. %.

The connecting element with the suspension deposited thereon is dried and sintered. Then an about 10 to 15 $\mu$m thick gas tight electrolyte layer 3 is deposited in the manner as described earlier.

An about 50 $\mu$m thick cathode layer 4 is deposited on the electrode layer 3 especially by spraying, drying and sintering of a suspension.

The anode consists for example of a nickel cermet. The electrolyte layer consists for example of yttrium-stabilized zirconium oxide (YSZ). The cathode consists for example of Sr-doped $LaMnO_3$.

Onto the comb structure of the component 1, a metal sheet 5 is soldered or welded. The metal sheet separates the anode chamber from the cathode chamber in a gas-tight manner. It may project sidewardly from the bi-polar plate as shown and is bent over. In this way, it can contribute to the gas-tight separation of the electrode chambers.

The metal sheet 5 consists particularly of the same alloy as the component 1. Strips 6 are soldered or welded onto the metal sheet 5. They provide for the distribution of gas in the respective cathode chamber. The strips 6 consist of the same material as the component 1 and are also porous.

Since the strips 6 are also porous, an operating medium can more easily reach the areas of an electrode adjacent the strips 6.

The connecting element consists of a metallic material. Thermally produced expansions are the same. Destructive tensions will therefore not occur. The metallic material is easy to work and has a high electrical and thermal conductivity, which is desirable. The good heat conductivity of the material results in an even temperature distribution. With the welding or soldering, resistance-free transitions are obtained. Because of the gas diffusion barrier, the methane steam reformation speed and the fuel oxidation speed (electrochemical reaction) correspond closely.

As indicated in the figure, any number of fuel cells can be disposed on top of one another with a connecting element disposed between adjacent fuel cells. In the two fuel cells shown in the figure the same numerals are used for indicating the same parts of the different cells.

What is claimed is:

1. A fuel cell stack including:
   a) at least two fuel cells, each fuel cell comprising a cathode, and an anode with an electrolyte layer disposed between said anode and said cathode, said anode being provided with a catalyst for reforming or oxidizing fuel, and
   b) a connecting element of a metal or metal alloy disposed between said at least two fuel cells so as to electrically and mechanically interconnect said at least two fuel cells, said connecting element having opposite porous walls which are disposed adjacent said anode and cathode respectively.

2. A fuel cell stack according to claim 1, wherein said anode consists of a cermet.

3. A fuel cell stack according to claim 1, wherein said connecting element is composed of several components which are joined by welding or soldering.

4. A method of providing in a fuel cell an anode on a porous metallic connecting element said method comprising the steps of: placing a suspension containing a powder of a material, of which said anode consist, onto a surface of said porous metallic connecting element and subsequently drying and sintering said suspension to form said anode on the surface of said porous connecting element.

* * * * *